(12) United States Patent
Johnson

(10) Patent No.: US 6,201,369 B1
(45) Date of Patent: Mar. 13, 2001

(54) SCR PROTECTION FROM STALLED MOTOR WITHOUT CURRENT SENSING

(75) Inventor: Lynn Stewart Johnson, Aurora, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/164,944

(22) Filed: Oct. 2, 1998

(51) Int. Cl.$^7$ ........................................................ H02P 5/28
(52) U.S. Cl. ........................ 318/811; 318/805; 318/812; 361/86
(58) Field of Search ........................... 318/728–832; 361/31, 33, 86, 91

(56) References Cited

U.S. PATENT DOCUMENTS

| | | | |
|---|---|---|---|
| 4,459,529 | * 7/1984 | Johnson | 318/729 |
| 4,525,660 | * 6/1985 | Katto | 318/798 |
| 5,280,227 | * 1/1994 | Bashark | 318/751 |
| 5,473,241 | * 12/1995 | Chen et al. | 318/807 |
| 5,682,091 | * 10/1997 | Williamson et al. | 318/800 |

* cited by examiner

Primary Examiner—David S. Martin

(57) ABSTRACT

A motor controller controls a motor operated by an AC line voltage. The controller includes an SCR connectable between an AC line and a motor terminal for controlling application of AC line voltage to the motor. A voltage sensor is operatively associated with the SCR to sense voltage across the SCR. A control circuit is connected to the sensor and the SCR for varying relative duration of on time and off time during each cycle of line voltage to control motor voltage at a reference level. The control circuit determines if a motor stall condition occurs responsive to the sensed SCR voltage and, in response to determining that a motor stall condition occurs, reducing motor voltage by decreasing duration of on time to protect the solid state switch means SCR.

10 Claims, 3 Drawing Sheets

SCR PROTECTION FROM STALLED MOTOR WITHOUT CURRENT SENSING

FIELD OF THE INVENTION

This invention relates to a motor controller utilizing SCR protection from stalled motor conditions without current sensing.

BACKGROUND OF THE INVENTION

Solid state starters/controllers have found widespread use for controlling application of power to an AC induction motor. The starter/controller, referred to hereinafter as simply a controller, uses an SCR, such as a triac, for controlling application of AC line voltage to the motor. The controller typically includes heat sinks associated with the SCRs for dissipating heat. When the controller has been running for an extended period of time, the heat sinks and SCRs become warm. If the motor stalls, then the SCRs must carry the motor stall current until protective overload relays trip to stop operation. The size of both the SCR and heat sink must become larger as the test current during stall is increased. In fact, when testing to IEC 947-4-2 standards, the prospective test current is 7.2 times the operational rating of the controller.

Currently controllers must be provided with larger SCRs and/or heat sinks to pass the tests. Alternatively, a current sensor must be used to limit the current during a stalled motor condition. This can increase the cost of the product.

These problems exist because the overload capacity of the overload relay may not match the overload capacity of the controller. At stall currents the overload capacity of the overload relay decreases more slowly than that of the controller. Thus, the controller may not be able to withstand the overload condition of the IEC test for the time that is required for the overload relay to trip.

The present invention is directed to solving one or more of the problems discussed above in a novel and simple manner.

SUMMARY OF THE INVENTION

In accordance with the invention there is disclosed a motor controller that provides protection from stalled motor conditions without use of current sensors.

Broadly, there is disclosed herein a motor controller for a motor operated by an AC line voltage. The controller includes solid state switch means connectable between an AC line and a motor terminal for controlling application of AC line voltage to the motor. Sensing means operatively associated with the solid state switch means sense voltage across the switch means. A control circuit is connected to the sensing means and the switch means for varying relative duration of on time and off time during each cycle of line voltage to control motor voltage at a reference level. The control circuit includes means for determining if a motor stall condition occurs responsive to the sensed voltage across the switch means and, in response to determining that a motor stall condition occurs, reducing motor voltage by decreasing duration of on time to protect the solid state switch means.

It is a feature of the invention that the switch means comprises a silicon controlled rectifier.

It is another feature of the invention that the switch means comprises a triac.

It is a further feature of the invention that the determining means determines that a stall condition occurs if voltage generated by the motor, as sensed by the sensing means, is above a preselect level. The control circuit resumes controlling voltage to the reference level if voltage generated by the motor, as sensed by the sensing means, is below a second preselect level after a stall condition occurs.

It is another feature of the invention that the determining means measures sensed voltage during the off time.

It is an additional feature of the invention that the control circuit reduces the reference level if a stall condition occurs.

It is still a further feature of the invention that the sensing means comprises a comparator.

It is yet another feature of the invention that the control circuit increases off time if a stall condition occurs.

It is yet another feature of the invention that the control circuit decreases off time after a stall condition has terminated as determined by the determining means.

There is disclosed in accordance with another aspect of the invention a motor controller for a motor operated by an AC line voltage. The controller includes solid state switch means connectable between an AC line and a motor terminal for controlling application of AC line voltage to the motor. Voltage sensing means sense motor voltage. Speed sensing means sense motor speed. A control circuit is connected to the voltage and speed sensing means and the switch means for varying relative duration of on time and off time during each cycle of line voltage to control motor voltage at a select reference level. The control circuit includes means for determining if a motor stall condition occurs responsive to the sensed speed, and in response to determining that a motor stall condition occurs reducing motor voltage by decreasing duration of on time to protect the solid state switch means.

It is a feature of the invention that the determining means determines that a stall condition occurs if speed, as sensed by the speed sensing means, is above a preselect level. The control circuit resumes controlling voltage to the reference level if speed, as sensed by the speed sensing means, is below a second preselect level after a stall condition occurs.

It is yet another feature of the invention that the speed sensing means measures sensed voltage during the off time.

More particularly, solid state switch means are protected from stalled motor currents by sensing the EMF voltage generated by the motor during the off time of the solid state switch means. The magnitude of the EMF across the switch means increases as the motor stalls and the motor current increases. The level of over current that trips the circuit can be varied to change the level of EMF required to trip the protective circuit. When this increase is seen above a preselect trip level, then the controller decreases the applied voltage to the motor load. This reduces the stall current. The reduction of stall current allows smaller heat sinks and/or SCRs to be used.

Further features and advantages of the invention will be readily apparent from the specification and from the drawing.

DETAILED DESCRIPTION OF THE INVENTION

Figure 1:
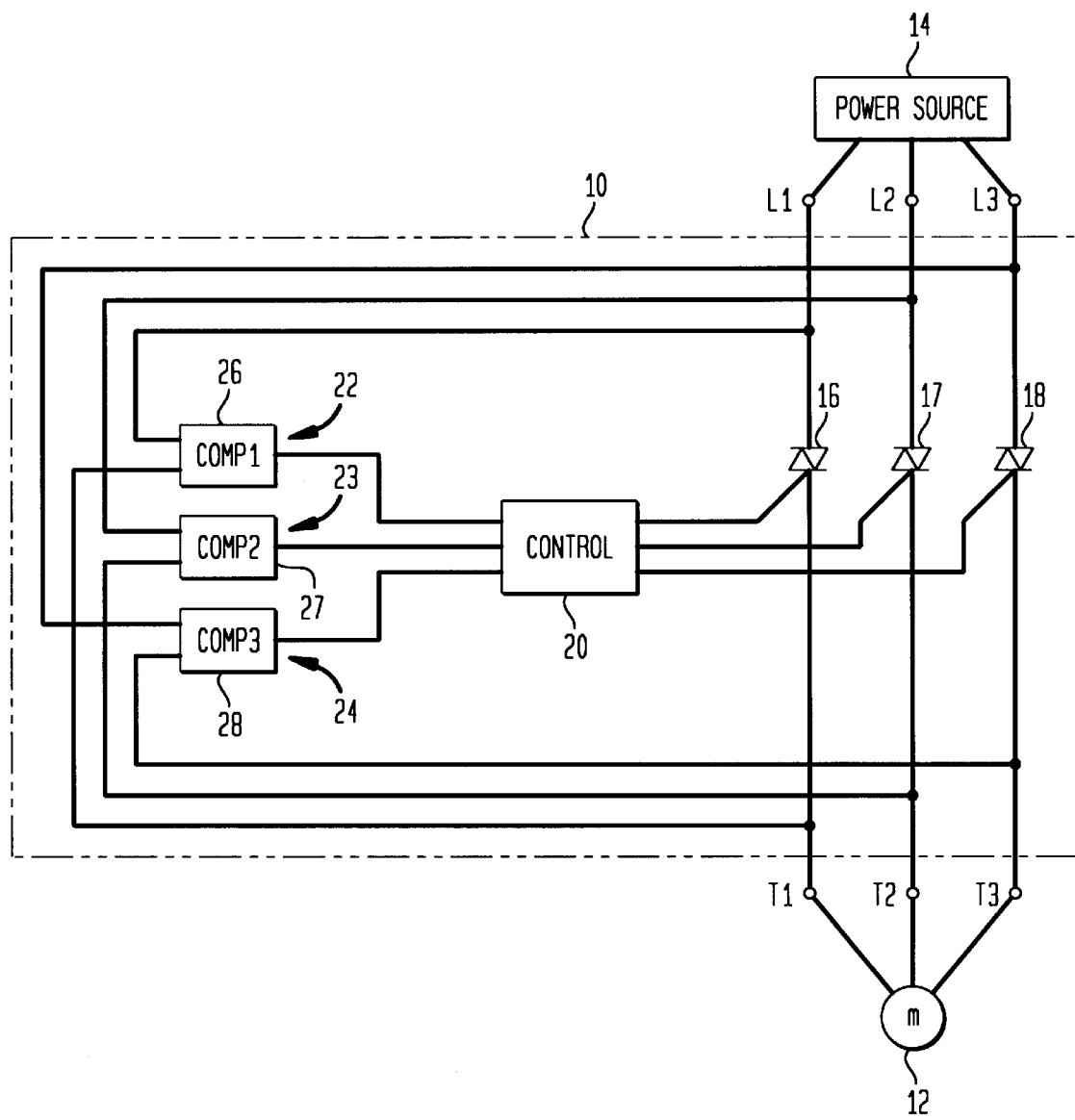
FIG. 1 is a block diagram of a motor system including a motor controller according to the invention.

Referring to FIG. 1, a motor controller 10 according to the invention controls operation of a motor 12 supplied by an AC line voltage developed by an AC power source 14. The power source 14 supplies line voltage, typically 200 to 690 volts AC, at terminals L1, L2 and L3. The motor controller 10 includes solid state switches in the form of two antiparallel silicon controlled rectifiers (SCRs), or single triacs 16, 17 and 18. The triacs 16–18 are connected between the respective line terminals L1, L2, and L3 and respective motor terminals, T1, T2 and T3. The triacs 16–18 control application of three phase AC line voltage 14 to the motor 12.

The invention described herein relates to protection of the SCRs or triacs 16–18 from stalled motor conditions without use of current sensing. The controller 10 is illustrated for controlling a three phase system. However, the invention can be used in connection with motor controllers for controlling any number of phases, as will be apparent.

The triacs 16–18 are, in effect, bidirectional SCRs. A triac is a gate controller semiconductor device which permits current flow therethrough when the voltage on its gate exceeds a threshold value. Once the threshold has been exceeded, then current continues to flow through the triac until the current returns to zero, at which time conduction ceases until the gate threshold voltage is again exceeded. The triacs 16–18 are controlled by a control circuit 20. The control circuit 20 varies relative duration of on time and off time during each cycle of line voltage to control motor voltage at a reference level. The control circuit 20 is generally conventional in nature, and develops the switching signals for controlling the triacs 16–18. In the illustrated embodiment of the invention, the controller 10 comprises a solid state starter/controller which provides reduced voltage starting. The control initially operates the motor 12 at a reduced voltage and subsequently increases voltage until it reaches steady state operation. The basic switching scheme for controlling operation of the triacs 16–18 is described in, but not limited to, my U.S. Pat. No. 4,459,529, owned by the assignee of the present application, the specification of which is hereby incorporated by reference herein. The present invention deals with an improvement in which the SCRs or triacs 16–18 are protected from stalled motors without the use of current sensors.

The controller 10 typically includes voltage sensing circuits 22, 23 and 24, one for each phase. The first sensing circuit 22 includes a first comparator 26 connected across the first triac 17 for sensing voltage between L1 and T1. The second voltage sensing circuit 23 includes a second comparator 27 connected across the second triac 17 for detecting the voltage between L2 and T2. The third voltage sensing circuit 24 includes a third comparator 28 connected across the third triac 18 for determining the voltage between L3 and T3. Each comparator 26–28 develops an analog signal proportional to the associated voltage difference which is input to the control circuit 20.

The control circuit 20 comprises an analog circuit or programmed microcontroller, microprocessor programmed in a conventional manner to control the triacs 16–18 using the voltage signals from the comparators 26–28. A programmed microprocessor is shown here. As discussed, under normal operation the control scheme for the triacs 16–18 is as described in U.S. Pat. No. 4,459,529 incorporated by reference herein.

IEC 947-4-2 comprises a technical specification providing standards for solid state controllers and starters. In accordance with this standard, the contactor must start and run at full load until thermally stabilized, or after approximately six to eight hours. The triacs 16–18 must withstand 7.2 times the current rating to simulate an overload condition. With the SCRs already warm, they will overheat quickly. The triacs 16–18 must be able to withstand this heat sufficient time for overload relays (not shown) to trip. The control circuit 20 is programmed to provide protection of the triacs 16–18 from such stalled motor conditions without the use of current sensing.

In accordance with the invention, the voltage sensing circuits 22–24 sense voltage across the switches 16–18. The control circuit 20 protects the switches 16–18 from stalled motor currents by sensing the EMF voltage generated by the motor 12 during the time between conduction of the triacs 16–18. The magnitude of the EMF measured across the triacs 16–18 increases as the motor stalls and the motor current increases. The level of over current that trips the protective circuit can be varied to change the level of EMF required to trip the protective function. When this increase is seen above the trip level, then the control circuit 20 decreases the applied voltage to the motor 12. This reduces the stall current and therefore protects the triacs 16–18.

Figure 2:
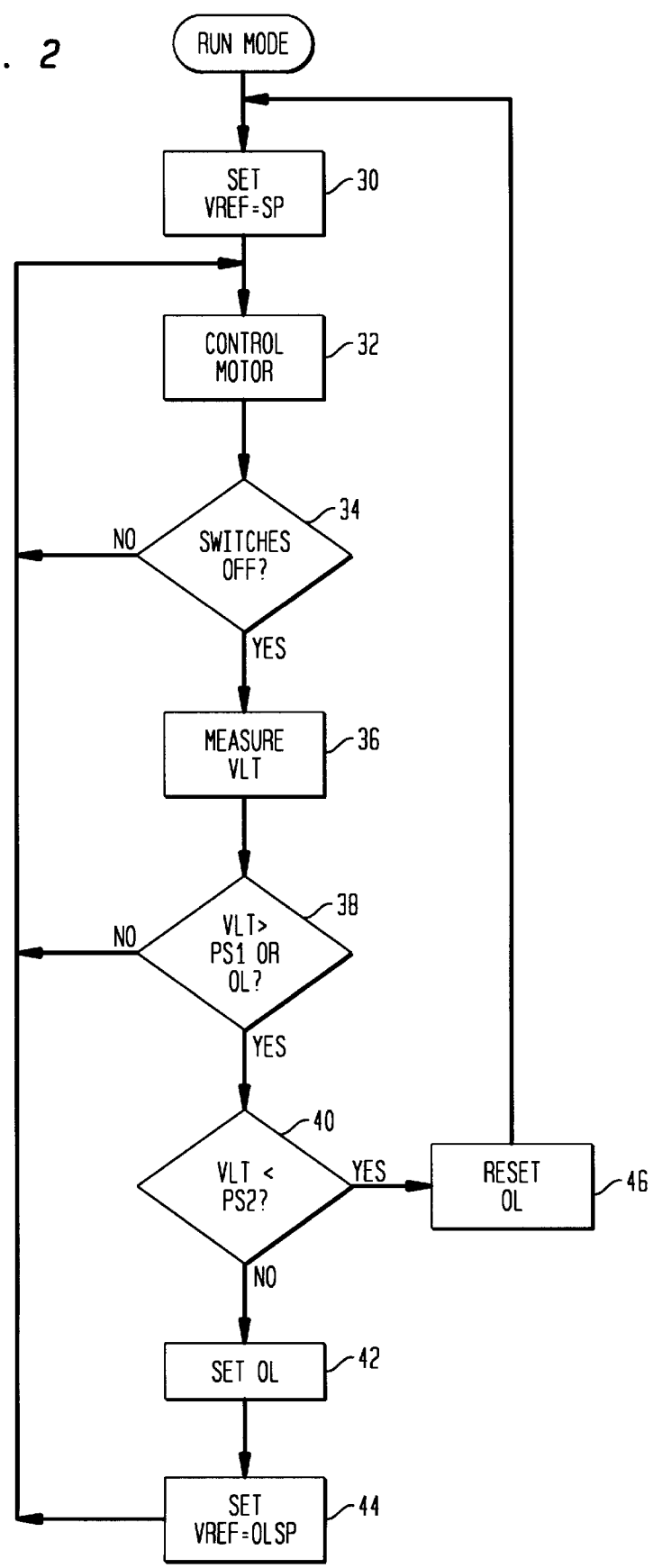
FIG. 2 is a flow diagram routine implemented in a control circuit of FIG. 1.

With reference to FIG. 2, a flow diagram illustrates operation of the control circuit 20 during a run mode. As discussed above, the control circuit 20 is also programmed to implement reduced voltage starting. The functions of reduced voltage starting and basic triac switching control is not illustrated in detail herein, as they are conventional in nature. The run mode begins at a block 30, which sets a voltage reference level equal to a preselect set point SP for normal motor operation. A control motor function is then implemented at a block 32. This control motor function develops the appropriate switching signals for varying relative duration of on time and off time during each cycle of line voltage to control motor voltage at the select reference level as determined by the set point SP. Particularly, the triacs 16–18 are controlled, for example, as generally described in U.S. Pat. No. 4,459,529. A decision block 34 then determines if one of the switches 16–18 is off. If not, then control returns to the block 32. If one of the switches is off, then a block 36 measures the voltage between the line and terminal for the particular phase using the signal from the associated comparator 26–28. A decision block 38 determines whether the measured voltage difference is greater than a first preselect value PS1, or if an overload register OL has been set. If not, then the motor is operating normally and control returns to the block 32. If so, then a decision block 40 determines if the voltage difference is less than a second preselect value PS2, lower than PS1. This value provides a dead band or hysteresis. If not, then a block 42 sets the OL register. The OL register is also used as part of the hysteresis function. Thereafter, the voltage reference is set to an overload set point OLSP at a block 44. The overload set point OLSP is lower than the normal set point SP. Control then returns to the block 32. Thus, when the voltage reference is set to OLSP, then motor voltage is reduced by decreasing duration of on time and increasing duration of off time to protect the switches 16–18. The control circuit 20 will continue to use the overload set point OLSP until the line terminal voltage is less than the second preselect level PS2 as determined at the decision block 40. At that point, the reset register OL is reset at a block 46 and control returns to the block 30 to again set the voltage reference to the normal set point level SP.

Figure 3:
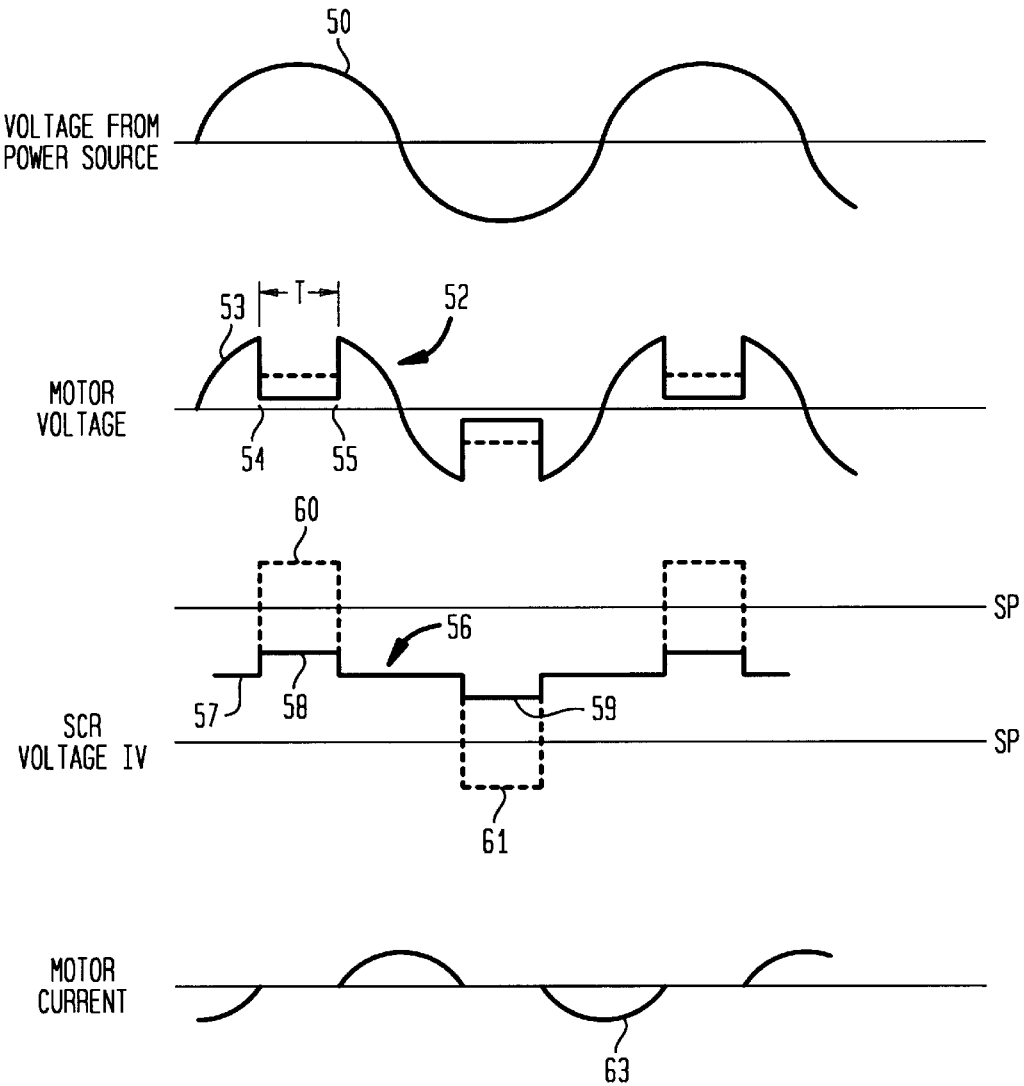
FIG. 3 is a series of curves illustrating operation of the system of FIG. 1.

Referring to FIG. 3, a series of curves are illustrated. A first curve 50 illustrates AC line voltage on one of the phases from the power source 14. A second curve 52 illustrates motor voltage. As is apparent, the curve 52 is generally similar to the curve 50, except for portions that are "chopped" for controlling motor voltage. The curve 63 illustrates the current flowing through the triacs 16–18 and the motor 12. The portions of the curve 52 which are not equal to the curve 50 represent the off time of the associated triacs 16–18. For example, in the first phase, the portion of the curve at 53 represents the triac 16 being on. The triac 16 turns off at a point 54 corresponding to the current through the triac 16 going to zero. The control circuit 20 then waits a time T before turning the triac 16 on again at a point 55. Particularly, the time T is used to control the relative on duration and off duration to maintain a desired voltage level. A curve 56 illustrates the voltage across the triac 16. For example, if the triac 16 is on, the voltage is approximately one volt, as illustrated at 57. When the triac is off, then the voltage is above or below one volt, as illustrated at 58 and 59. When the triac 16 is off, the motor 12 becomes a generator. The voltage across the triac depends on motor slip. At full speed there is low back EMF, as illustrated. Under stalled conditions the EMF voltage is much higher, as illustrated by the dashed lines 60 and 61.

The control circuit 20 senses the voltage spike 58 or 59 which is roughly proportional to speed. Thus, the control circuit 20 indirectly senses motor speed to determine stalled conditions. When a stalled condition is found to exist, such as illustrated at 60 and 61, the control circuit 20 reduces the voltage reference level to the overload set point, as discussed above. This is done by changing T which delays the point 57. This decreases motor voltage prior to the overloads tripping. This protects the triacs from damage. If the stall condition goes away, then the motor is allowed to come back to speed if the external overload relay has not tripped.

With such a system there will always be a finite time to measure back EMF, on the order of 30–50 microseconds. This is due to the fact that for an SCR pair, one will turn off before the other turns on, even at full speed, or for a triac, current stopping in one direction before current is started flowing in the other direction. Therefore, no delays are added to achieve the foregoing.

Thus, in accordance with the invention there is provided a control circuit which provides protection of the SCRs, or triacs, from stalled motor conditions without use of current sensing.

What is claimed is:

1. A motor controller for a motor operated by an AC line voltage comprising:

solid state switch means connectable between an AC line and a motor terminal for controlling application of AC line voltage to the motor;

sensing means operatively associated with the solid state switch means for sensing voltage across the switch means; and a control circuit connected to the sensing means and the switch means for varying relative duration of on time and off time during each cycle of line voltage to control motor voltage at a reference level, the control circuit including means for determining if a motor stall condition occurs responsive to the sensed voltage across the switch means and in response to determining that a motor stall condition occurs reducing motor voltage by decreasing duration of on time to protect the solid state switch means.

2. The motor controller of claim 1 wherein the switch means comprises a silicon controlled rectifier.

3. The motor controller of claim 1 wherein the switch means comprises a triac.

4. The motor controller of claim 1 wherein the determining means determines that a stall condition occurs if voltage generated by the motor, as sensed by the sensing means, is above a preselect level.

5. The motor controller of claim 4 wherein the control circuit resumes controlling voltage to the reference level voltage generated by the motor, as sensed by the sensing means, is below a second preselect level after a stall condition occurs.

6. The motor controller of claim 1 wherein the determining means measures sensed voltage during the off time.

7. The motor controller of claim 1 wherein the control circuit reduces the reference level if a stall condition occurs.

8. The motor controller of claim 1 wherein the sensing means comprises a comparator.

9. The motor controller of claim 1 wherein the control circuit increases off time if a stall condition occurs.

10. The motor controller of claim 9 wherein the control circuit decreases off time after a stall condition has terminated as determined by the determining means.

\* \* \* \* \*